United States Patent
Moision et al.

(10) Patent No.: US 10,391,582 B2
(45) Date of Patent: Aug. 27, 2019

(54) SYSTEM AND METHOD OF WELDING A WORKPIECE

(75) Inventors: William C. Moision, Northville, MI (US); Elizabeth Therese Hetrick, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 20 days.

(21) Appl. No.: 13/187,689

(22) Filed: Jul. 21, 2011

(65) Prior Publication Data

US 2013/0020288 A1 Jan. 24, 2013

(51) Int. Cl.
*B23K 11/24* (2006.01)
*B23K 11/11* (2006.01)
*B23K 11/25* (2006.01)

(52) U.S. Cl.
CPC .......... *B23K 11/115* (2013.01); *B23K 11/24* (2013.01); *B23K 11/25* (2013.01)

(58) Field of Classification Search
CPC .......... B23K 11/06–068; B23K 11/115; B23K 11/24
USPC .............. 219/108, 110, 115, 117.1, 86.1, 219/86.25–86.61, 86.7, 91.2, 92
See application file for complete search history.

(56) References Cited

U.S. PATENT DOCUMENTS

| | | | |
|---|---|---|---|
| 4,302,653 A * | 11/1981 | Denning et al. | 219/110 |
| 4,434,351 A * | 2/1984 | Nakata et al. | 219/117.1 |
| 4,456,810 A * | 6/1984 | Schumacher et al. | 219/110 |
| 4,694,135 A * | 9/1987 | Nagel et al. | 219/110 |
| 5,021,625 A * | 6/1991 | Destefan et al. | 219/109 |
| 5,308,948 A * | 5/1994 | Kawagoe | B23K 11/256 219/110 |
| 5,386,092 A | 1/1995 | Dufrenne | |
| 5,418,347 A * | 5/1995 | Kirker | B23K 11/115 219/110 |
| 5,484,975 A * | 1/1996 | Itatsu | B23K 11/115 219/86.7 |
| 5,489,757 A * | 2/1996 | Schuermann et al. | 219/110 |
| 6,169,263 B1 | 1/2001 | Derby, Jr. et al. | |
| 6,515,259 B1 * | 2/2003 | Hsu et al. | 219/130.51 |
| 6,861,609 B2 | 3/2005 | Sigler | |
| 7,432,466 B2 | 10/2008 | Spinella et al. | |
| 8,176,793 B2 * | 5/2012 | Wang et al. | 73/850 |
| 8,933,362 B2 * | 1/2015 | Meulenberg | B23K 11/02 219/110 |
| 2005/0178483 A1 | 8/2005 | Nippert | |
| 2007/0029288 A1 * | 2/2007 | Fernandez | B23K 11/115 219/86.51 |
| 2008/0078749 A1 | 4/2008 | Sigler et al. | |

(Continued)

OTHER PUBLICATIONS

English translation of WO 2007077393 to Bordesoules, Isabelle; published Jul. 12, 2007.*

(Continued)

*Primary Examiner* — Michael A Laflame, Jr.
(74) *Attorney, Agent, or Firm* — Raymond Coppiellie; Brooks Kushman P.C.

(57) ABSTRACT

A system and method of welding a workpiece. A predetermined current may be applied through electrodes that engage the workpiece. A resistance profile may be generated based on the predetermined current. A weld profile may be selected based on the resistance profile. The weld profile may then be executed to weld the workpiece.

12 Claims, 3 Drawing Sheets

(56) References Cited

U.S. PATENT DOCUMENTS

| | | | |
|---|---|---|---|
| 2008/0180115 A1* | 7/2008 | Hiratsuka | G01N 27/20 |
| | | | 324/691 |
| 2011/0168680 A1 | 7/2011 | Holzhauer | |
| 2013/0020288 A1 | 1/2013 | Moision et al. | |

OTHER PUBLICATIONS

1997 IEEE International Conference on Intelligent Processing Systems, Beijing, China, Xingqiao Chen and Kenji Araki, Adaptive Process Control of "Fuzzy Adaptive Process Control of Resistance Spot Welding with a Current Reference Model," Oct. 28-31, 1997.

Armed Services Technical Information Agency, The Budd Company, "Development of Automatic Quality Control for Resistance Welds in Aluminum Alloys," Feb. 20, 1962, Philadelphia, Pennsylvania.

"Selecting Welding Electrodes for Spod Welding"; Everlast Power Equipment, Spot Welding Articles, 1 page; http://www.everlastgenerators.com/selecting-welding-electrodes-spot-welding.

Ilhan Tarimer, et al.; "A Case Study of a New Spot Welding Electrode Which Has the Best Current Density by Magnetic Analysis Solutions"; Journal of Electrical Engineering, vol. 62, No. 4, 2011, pp. 233-238.

* cited by examiner

SYSTEM AND METHOD OF WELDING A WORKPIECE

TECHNICAL FIELD

The present application relates to a system and method of welding a workpiece.

BACKGROUND

An electrical resistance spot welding method is disclosed in U.S. Pat. No. 7,432,466.

SUMMARY

In at least one embodiment, a method of welding a workpiece is provided. Electrodes may engage the workpiece at a predetermined load force level. A first profile may be generated by applying a predetermined current through the electrodes when the predetermined load force is applied. A weld profile may be selected based on the first profile. The weld profile may then be executed to weld the workpiece.

In at least one embodiment a method of welding a workpiece is provided. First and second electrodes engage opposite sides of the workpiece at a first force level. A fixed current is applied through the electrodes. A first set of attributes is generated that includes a first resistance slope, a second resistance slope, and a steady state resistance value. A member of a weld profile set is selected based on the first set of attributes. The selected member of the weld profile set is executed to weld the workpiece. A second set of attributes is measured during execution of the weld profile that includes voltage data, current data, electrode position and electrode force. A member of a second profile set is selected based on the second set of attributes. The member of the second profile set is executed to forge and/or heat treat the workpiece.

In at least one embodiment a system for welding a workpiece is provided. The system includes first and second electrodes, an actuator and a power supply unit. The actuator actuates at least one of the first and second electrodes into engagement with the workpiece. The power supply unit is electrically coupled to the electrodes. A predetermined fixed current is provided by the power supply unit through the first and second electrodes to generate a ramp up slope, a ramp down slope, and a steady state current. A weld profile is executed to weld the workpiece. The weld profile is selected based on at least one of the ramp up slope, ramp down slope and the steady state current.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
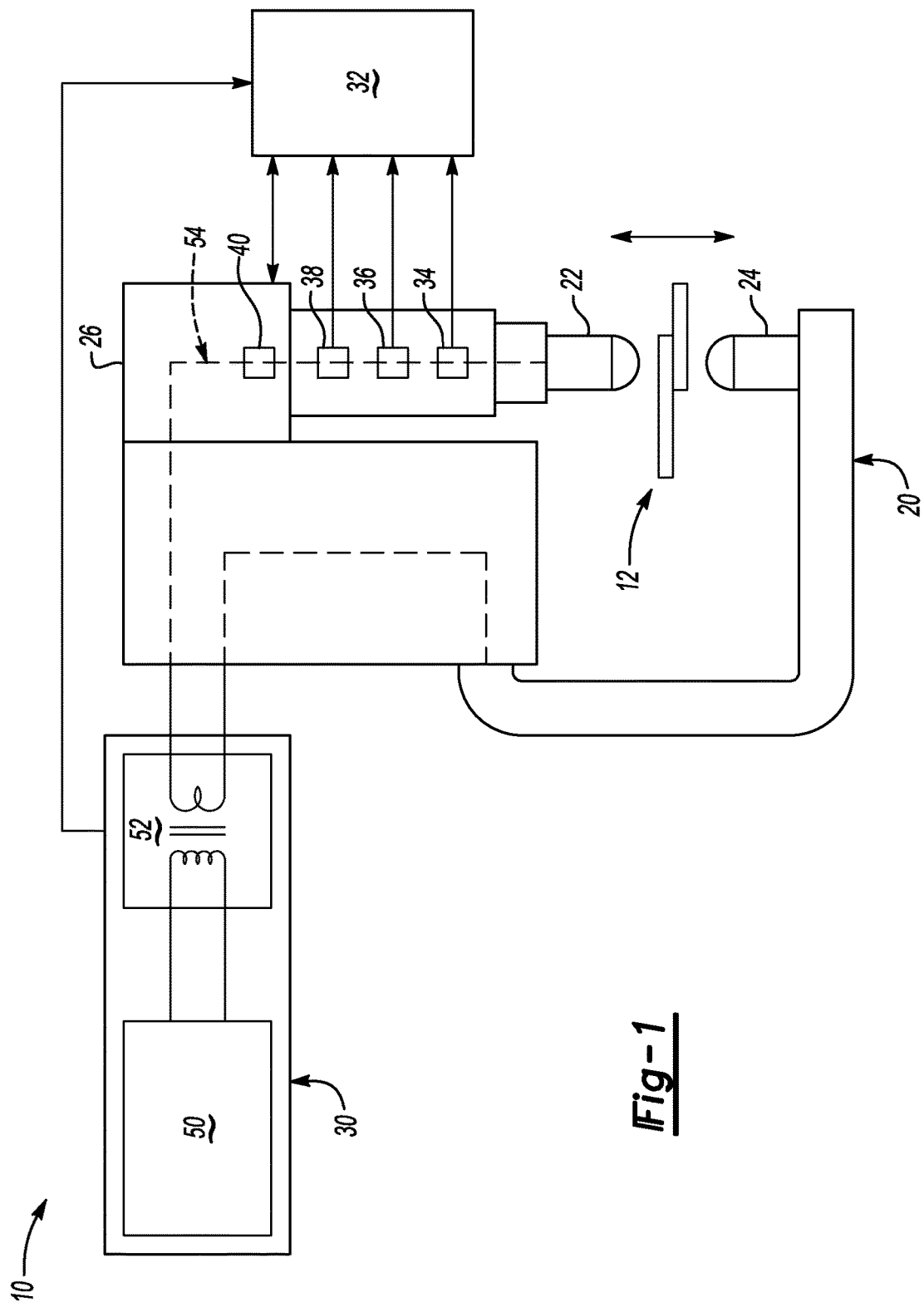
FIG. 1 is a schematic of the exemplary welding system.

Referring to FIG. 1, an exemplary welding system 10 is shown. The welding system 10 may be configured to weld one or more workpieces 12 together. In at least one embodiment, the welding system 10 may be an electric resistance welding system in which current is passed through a workpiece 12 to generate heat that may be used to form a weld.

The welding system 10 may include a weld gun assembly 20. The weld gun assembly 20 may be disposed on a manipulator, such as a robot, that may position the weld gun assembly 20 with respect to the workpiece 12. Alternatively, the weld gun assembly 20 may be disposed on a generally stationary support structure and the workpiece 12 may be positioned with respect to the weld gun assembly 20. The weld gun assembly 20 may have any suitable configuration. For example, the weld gun assembly 20 may include a first electrode 22, a second electrode 24, and one or more actuators 26.

The first and second electrodes 22, 24 may conduct current through the workpiece 12 to create a weld that may join two or more pieces together. As such, a spot weld or weld seam may be produced on the workpiece 12. The first and second electrodes 22, 24 may be of any suitable type and may have any suitable configuration. In at least one embodiment, the first and second electrodes 22, 24 may be aligned with each other and disposed along opposite sides of the workpiece 12 during execution of a weld.

One or more actuators 26 may be provided to position the first and/or second electrodes 22, 24 with respect to each other or with respect to the workpiece 12. For instance, the first electrode 22 may be stationary and the actuator 26 may move the second electrode 24 toward or away from the first electrode 22 or vice versa. Alternatively, one or more actuators 26 may move both the first and second electrodes 22, 24 toward or away from each other. In the embodiment shown, the actuator 26 may be a servo motor that may be associated with a control module or controller as will be discussed in more detail below.

The welding system 10 may also include a power supply system 30, one or more control modules or controllers 32, and one or more sensors, such as a current sensor 34, a voltage sensor 36, a load sensor 38, and a position sensor 40.

The power supply system 30 may be configured to provide sufficient electrical current to the electrodes 22, 24 to facilitate welding. The power supply system 30 may include a power source 50 that provides electrical energy to a transformer 52. The transformer 52 may provide current. The power supply system 30 and electrodes 22, 24 may cooperate to define at least a portion of a welding electrical circuit 54. For example, current may flow from the first electrode 22 to the second electrode 24 or vice versa when the electrodes 22, 24 engage the workpiece 12 or are positioned in a manner to close the circuit.

One or more controllers 32 may be configured to monitor and control operation of the welding system 10 and execution of a weld. For simplicity, a single controller 32 is shown in FIG. 1. The controller 32 may be electrically connected or communicate with the actuator 26 and power supply system 30 to monitor and control their operation and performance. In an embodiment having an actuator 26 configured as a servo motor, the controller 32 may monitor and control the position of one or more electrodes 22, 24 via a servo motor controller in a manner known to those skilled in the art.

The control module 32 may also process input signals or data from the current sensor 34, voltage sensor 36, load sensor 38, and position sensor 40. The current sensor 34 may detect and provide a signal or data indicative of electrical current in the welding electrical circuit 54, such as a current level proximate the electrodes 22, 24 or the workpiece 12 during execution of a weld. The voltage sensor 36 may detect and provide a signal or data indicative of voltage in the welding electrical circuit 54. The load sensor 38 may detect and provide a signal or data indicative of force applied by the electrodes 22, 24 to the workpiece 12, such as may result from operation of the actuator 26. The position sensor 40, if provided may detect and provide a signal or data indicative of the position of the position of one or more components of the weld gun assembly 20. The position sensor 40 may be provided with the servo motor or other movable component and may be a virtual sensor that may be based on control logic of the actuator 26 or servo motor.

Figure 2:
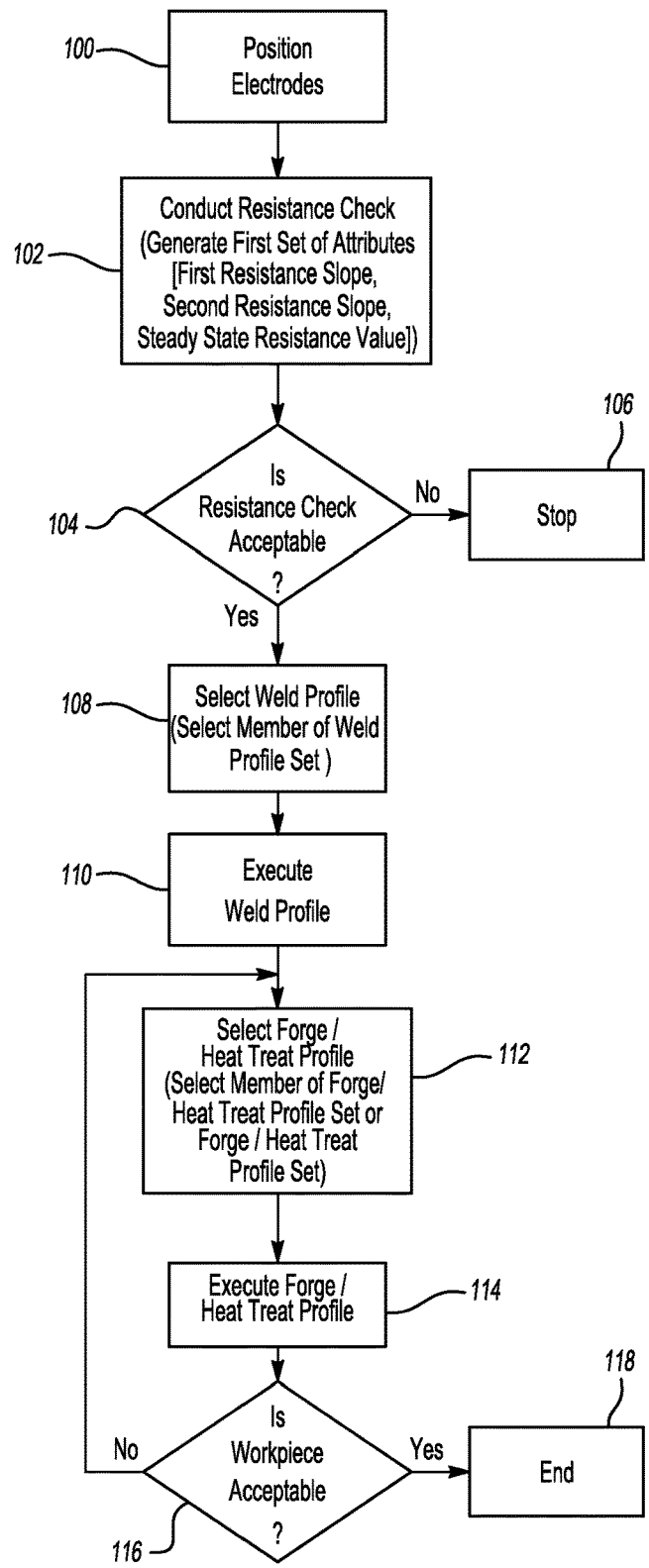
FIG. 2 is a flowchart of an exemplary method of welding a workpiece.

Referring to FIG. 2, a flowchart of an exemplary method of controlling a welding system 10 is shown. As will be appreciated by one of ordinary skill in the art, the flowchart may represent control logic that may be implemented or affected in hardware, software, or a combination of hardware and software. For example, the various functions may be affected by a programmed microprocessor. The control logic may be implemented using any of a number of known programming and processing techniques or strategies and may not be limited to the order or sequence illustrated. For instance, interrupt or event-driven processing may be employed in real-time control applications rather than a purely sequential strategy as illustrated. Likewise, parallel processing, multitasking, or multi-threaded systems and methods may be used. Control logic may be independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the method of control. The illustrated functions may be modified, or in some cases omitted, without departing from the spirit or scope of the present invention.

Figure 3:
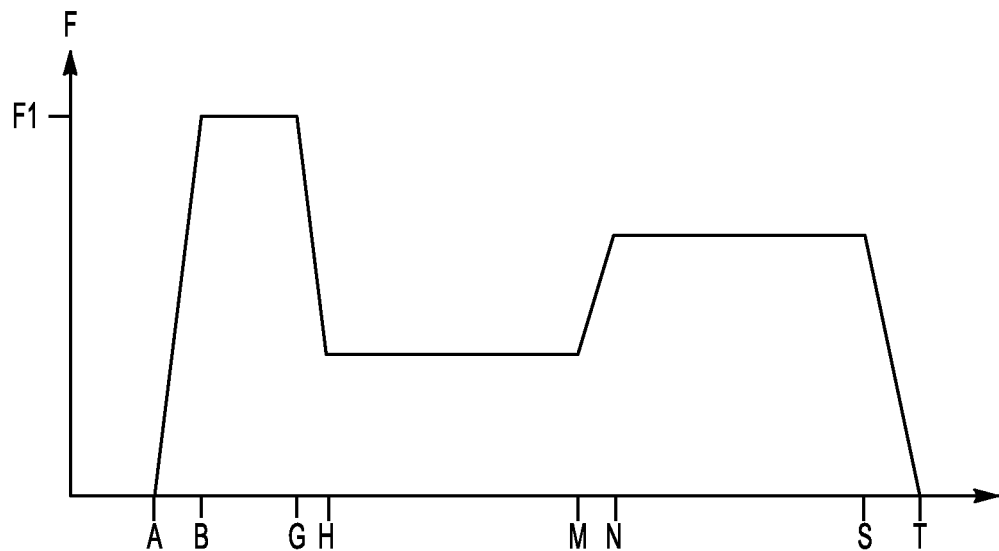
FIG. 3 is an exemplary plot of welding parameters.
Figure 3:
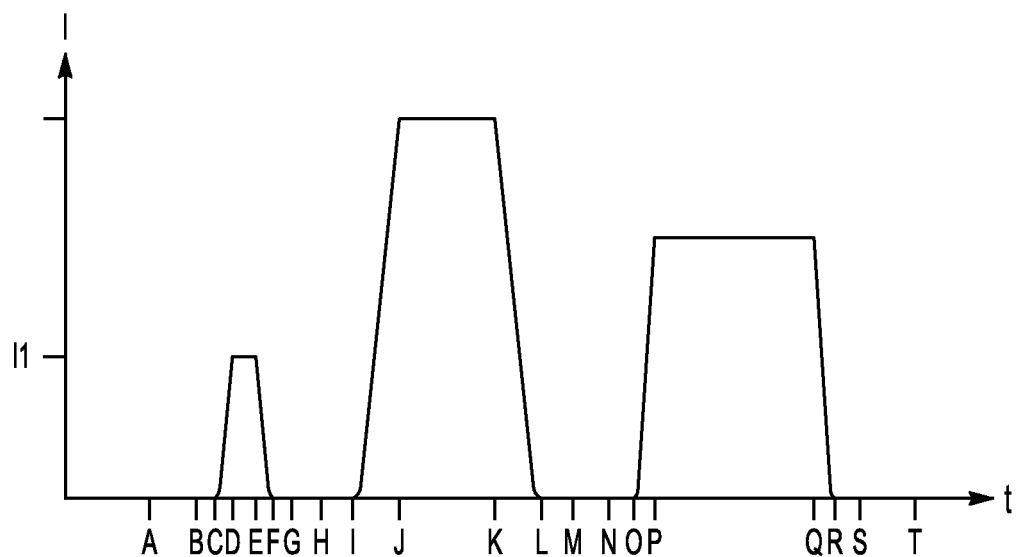

To assist with understanding of the method steps, an exemplary plot is shown in FIG. 3. FIG. 3 is discussed in more detail after the discussion of the method steps shown in FIG. 2.

At 100, the method begins by positioning the electrodes 22, 24. Positioning the electrodes may include positioning the weld gun assembly 20 at a desired location for executing a weld upon the workpiece 12. Alternatively, the workpiece 12 may be positioned with respect to the weld gun assembly 20 as previously discussed.

Positioning the electrodes may also include actuating one or more electrodes 22, 24 with the actuator 26 such that the electrodes 22, 24 engage and apply force against the workpiece 12. The force applied by the electrodes 22, 24 may help break through any surface layer contaminants and/or oxides that may be present on an external workpiece surface. For example, in the case of a workpiece made of an aluminum alloy, a surface layer may act as an insulator that may reduce or inhibit electrical conduction between the electrodes 22, 24 and through the workpiece 12. A predetermined load force (designated $F_1$ in FIG. 3) may be exerted against the workpiece 12. Such force may be measured with the load sensor 38. In addition, no current may be provided via the electrodes 22, 24 until the predetermined load force is attained.

At 102, a resistance check is conducted. The resistance check may be conducted by providing current via the electrodes 22, 24 and measuring current and voltage while the predetermined load force is applied to the workpiece 12. Resistance may be calculated based on the current and voltage measurements.

Current may be applied at a low level that does not result in melting or welding of the workpiece 12 during the resistance check. In addition, this current may be predetermined. More specifically, when current is applied during the resistance check, the detected current may increase from zero to a steady state current amount (designated $I_1$ in FIG. 3) and then decrease back to zero when current is not provided. The change in current may be used to determine a ramp-up slope and a ramp-down slope. The ramp-up slope may be slope of a line or rate at which current increases from zero to the steady state current amount. The ramp-down slope may be the rate at which current decreases from the steady state amount to zero.

At 104, the method determines whether the resistance check is acceptable. This determination may be based on a comparison of resistance during the resistance check (which may be calculated based on the current and voltage detected when the steady state current amount should be attained) and a predetermined resistance value or characteristic. In addition, other attributes such as the magnitude of force applied and position of the electrodes when a fixed force and fixed current are applied may be used to determine whether the resistance check is acceptable. If the resistance is consistent with one or more predetermined characteristics or the resistance is greater than the predetermined resistance value, then the method may stop at block 106. If the resistance is not consistent with one or more predetermined characteristics or the resistance is less than the predetermined resistance value, then the method continues at block 108.

At 108, a weld profile is selected. A set of predetermined weld profiles that designate the force and current levels to be applied over a period of time to weld the workpiece may be provided and stored in an accessible memory media. A member of the set of predetermined weld profiles may be selected based on characteristics or attributes measured during the resistance check. For example, one or more characteristics or attributes such as the ramp up slope, ramp down slope, and steady state resistance amount (e.g., resistance detected when the steady state current is applied) may be utilized. In such an embodiment, predetermined weld profiles may be provided in a lookup table and may be referenced or looked up based on the ramp up slope, ramp down slope, and steady state resistance amount.

At 110, the selected weld profile is executed to weld the workpiece. The weld profile may be executed by providing current and force to the workpiece 12 with the weld gun assembly 20 in accordance with the attributes or configuration of the selected weld profile. Various weld characteristics may be dynamically measured when the selected weld profile is executed. These characteristics may include current, voltage, electrode position, and electrode force (i.e., the force applied by the electrodes to the workpiece, which may be referred to as a first force level). Current and voltage may be based on data from the current and voltage sensors 34, 36, respectively. Electrode position may be based on position data from the servo motor. Electrode force may be based on data from the load sensor 38.

At 112, a forge/heat treat profile is selected. A set of predetermined forge/heat treat profiles, which may also be referred to as a forge/heat treat profile set or a second profile set, that designate the force and current levels to be applied over a period of time to forge and/or heat treat the workpiece may be stored in an accessible memory media. A member of the set of forge/heat treat profiles may be selected based on the current, voltage, electrode position and electrode force data obtained during execution of the weld.

At 114, the selected forge/heat treat profile is executed to forge and/or heat treat the workpiece. The forge/heat treat profile may be executed by providing current and force to the workpiece with the weld gun assembly 20 in accordance with the attributes or configuration of the selected forge/heat treat profile.

At 116, the method determines whether the workpiece is acceptable. Determination of whether the workpiece is acceptable may be based on comparing data obtained during execution of the selected forge/heat treat profile to predetermined values or acceptance ranges. For instance, forge/heat treat data attributes, such as current, voltage, electrode position and/or electrode force data may be obtained during execution of the selected forge/heat treat profile and compared to predetermined values or acceptance ranges. If one or more the forge/heat treat attributes are not within an associated acceptance range, then the workpiece is not acceptable and the method may return to block 112 to repeat the selection of a forge/heat treat profile. This selection may be based on the forge/heat treat attributes, or data measured during execution of the preceding execution of the forge/heat treat profile. If the forge/heat treat attributes are within associated acceptance ranges, then the workpiece is acceptable and the method may end at block 118.

Referring to FIG. 3, an exemplary split plot depicting force and current that may be applied to the workpiece 12 is shown. In FIG. 3, force (F) and current (I) are plotted with respect to a common period of time (t) which is plotted along the horizontal axis.

At time 0, the electrodes do not engage the workpiece. Thus, no force is applied by electrodes against the workpiece and current does not flow through the electrodes.

At time A, the electrodes engage the workpiece. The force applied by the electrodes is increased from zero to the predetermined load force amount $F_1$ at time B.

At time C, execution of the resistance check begins by providing current via the electrodes. The current increases from zero at time C to a steady state current amount $I_1$ at time D. The rate of change between time C and time D is the ramp up slope. The steady state current amount $I_1$ is maintained until time E.

At time E, the current is turned off. The detected current decreases from the steady state current amount $I_1$ to zero between time E and time F. The rate of change between time E and time F is the ramp down slope.

Between time G and time H, the force applied by the electrodes is decreased to a level below the predetermined load force amount $F_1$ so that execution of a selected weld profile may begin.

At or between time H and time I, execution of a selected weld profile begins. During execution of a weld profile, the force applied by the electrodes may be less than the predetermined load force amount $F_1$. In addition, the current applied may be greater than the steady state value $I_1$. In the example shown in FIG. 3, a constant electrode force is shown between time H and M and a constant current is shown between time J to time K; however the force and/or current may be varied during execution of different weld profiles. The maximum current level applied during execution of a weld profile may exceed the steady state value $I_1$ to permit melting of the workpiece proximate the electrodes. In addition, the current does not need to be decreased to zero after execution of the selected weld profile (e.g., current does not need to be decreased to zero at time L).

At time M, execution of the selected forge/heat treat profile begins. During execution of a forge/heat treat profile, the force applied by the electrodes may be less than or equal to the predetermined load force amount $F_1$. In addition, the current applied may be greater than the steady state value $I_1$. In the exemplary plot shown, a constant force is applied between time N and S and a constant current is applied between time P and Q; however the force and current may be varied during execution of different forge/heat treat profiles. After execution of the selected forge/heat treat profile, the current may be decreased to zero at time R and the force may be decreased to zero at time T to permit removal of the workpiece if the workpiece is acceptable.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method comprising:
   while electrodes are continually engaged with a workpiece, sequentially performing operations of
      concurrently applying to the workpiece, via the electrodes, a force and current to break through surface contaminants and check resistance without welding,
      responsive to the resistance falling within a predetermined range, decreasing the force and increasing the current according to a weld profile selected according to the resistance to weld the workpiece to form a welded workpiece, and
      increasing the force and decreasing the current to forge/heat treat the welded workpiece.

2. The method of claim 1 further comprising responsive to data values obtained during the performing being different from predetermined data values, repeating at least some of the operations.

3. The method of claim 2, wherein the data values include current data, voltage data, electrode position data, or electrode force data.

4. The method of claim 1 further comprising, responsive to the resistance falling outside the predetermined range, preventing the electrodes from welding the workpiece.

5. The method of claim 1, wherein the weld profile defines a ramp up slope for the increasing the current.

6. The method of claim 5, wherein the weld profile defines a ramp down slope for the decreasing the current.

7. A system comprising:
   first and second electrodes; and
   at least one controller configured to sequentially, while the electrodes are continually engaged with a workpiece,
      concurrently apply to the workpiece, via the electrodes, a force and current to break through surface contaminants and check resistance without welding,
      responsive to the resistance falling within a predetermined range, decrease the force and increase the current according to a weld profile selected according to the resistance to weld the workpiece to form a welded workpiece, and
      increase the force and decrease the current to forge/heat treat the welded workpiece.

8. The system of claim 7 wherein the controller is further configured to, responsive to data values obtained while the electrodes are continually engaged with the workpiece being different from predetermined data values, repeat operations to weld the workpiece.

9. The system of claim 8, wherein the data values include current data, voltage data, electrode position data, or electrode force data.

10. The system of claim 7 wherein the controller is further configured to, responsive to the resistance falling outside the predetermined range, prevent the electrodes from welding the workpiece.

11. The system of claim 7, wherein the weld profile defines a ramp up slope for the current.

12. The system of claim 5, wherein the weld profile defines a ramp down slope for the current.

* * * * *